United States Patent
Van Den Enden et al.

(10) Patent No.: US 6,700,861 B2
(45) Date of Patent: Mar. 2, 2004

(54) OPTICAL DISC AND APPARATUS FOR SCANNING THE OPTICAL DISC

(75) Inventors: Gijsbert J. Van Den Enden, Veldhoven (NL); Johannes H. M. Spruit, Eindhoven (NL); Johannus L. Bakx, Eindhoven (NL); Shoei Kobayashi, Shinagawa-Ku (JP); Masayuki Arai, Shinagawa-Ku (JP); Yoshiyuki Akiyama, Shinagawa-Ku (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/349,238

(22) Filed: Jan. 22, 2003

(65) Prior Publication Data

US 2003/0128644 A1  Jul. 10, 2003

Related U.S. Application Data

(63) Continuation of application No. 09/366,694, filed on Aug. 4, 1999, now Pat. No. 6,580,680.

(30) Foreign Application Priority Data

Aug. 4, 1998 (EP) .............................................. 98202625

(51) Int. Cl.$^7$ ................................................ G11B 7/00
(52) U.S. Cl. ................................ 369/275.3; 369/275.1; 369/59.25; 369/44.13
(58) Field of Search ................... 369/44.13, 44.26, 369/44.28, 47.1, 47.28, 44.31, 53.1, 53.11, 53.2, 53.28, 53.34, 53.41, 59.1, 59.25, 275.1, 275.3, 275.4

(56) References Cited

U.S. PATENT DOCUMENTS

| | | | |
|---|---|---|---|
| 4,901,300 A | 2/1990 | Van Der Zande et al. | .... 369/47 |
| 5,559,777 A | 9/1996 | Maeda et al. | ............... 369/47.5 |
| 6,069,869 A | * 5/2000 | Nagasawa et al. | ....... 369/275.3 |
| 6,147,961 A | 11/2000 | Nagasawa et al. | ....... 369/275.3 |

FOREIGN PATENT DOCUMENTS

| | | |
|---|---|---|
| EP | 0587019 A2 | 3/1994 |
| EP | 0827139 A2 | 4/1998 |
| WO | WO 9750083 | 12/1997 |

* cited by examiner

*Primary Examiner*—Muhammad Edun

(57) ABSTRACT

The invention relates to an optical disc for recording data at a constant density, so called CLV (Constant Linear Velocity) or at zoned CLV. The disc has headers distributed along the disc on regular angular positions, a so called CAV (Constant Angular Velocity) pattern subdividing the track in track portions for recording an amount of data proportional to the radial position of the track portion concerned. Address information included in the headers is provided at the data density, which is CLV. The apparatus comprises header detection means for detecting the headers at the CAV locations, and for recovering position information from the headers at CLV density. Data sectors do not start at headers and are not fitted regularly between the headers, but start and stop at arbitrary positions which are calculated from the known amounts of data recordable in the track portions.

35 Claims, 5 Drawing Sheets

OPTICAL DISC AND APPARATUS FOR SCANNING THE OPTICAL DISC

Figure 1A:
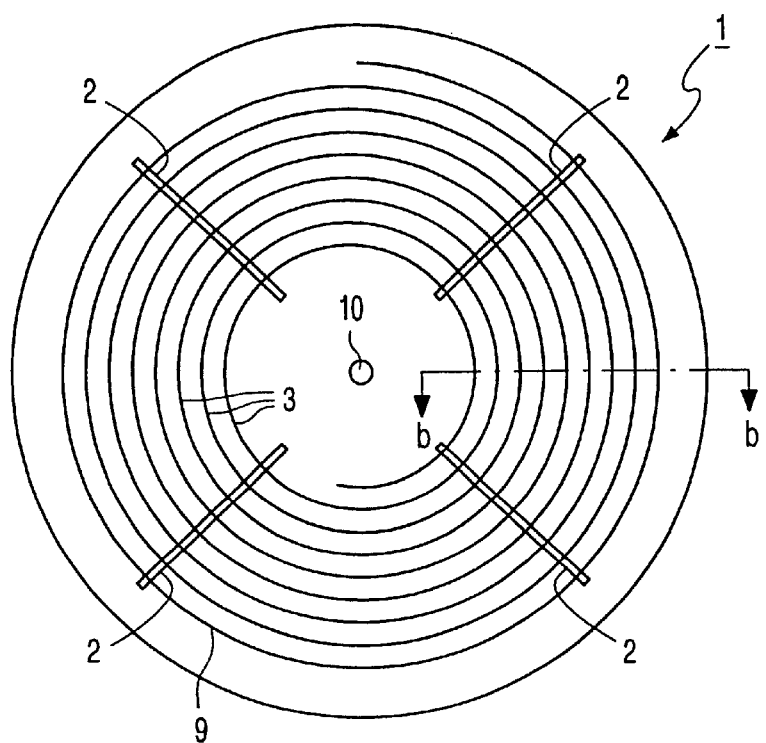

This application is a continuation of Ser. No. 09/366,694, filed Aug 4, 1999, U.S. Pat. No. 6,580,680.

The invention relates to an optical disc comprising a recording area for recording data at a substantially constant density, the recording area comprising circular or spiral tracks provided with a servopattern comprising headers alternating with track portions, the headers being radially aligned and comprising position information, and the track portions being arranged for storing an amount of data substantially proportional to the radial position of the track portion concerned.

The invention further relates to a recording device for recording data at a substantially constant density on an optical disc comprising a recording area comprising circular or spiral tracks provided with a servopattern comprising headers alternating with track portions, the headers being radially aligned and comprising position information, and the track portions being arranged for recording an amount of data substantially proportional to the radial position of the track portion concerned, which device comprises a recording head, recording control means and positioning means for positioning the recording head on a track at a position to be recorded, the positioning means comprising header detecting means for retrieving the position information from the headers.

The invention further relates to a reading device for reading data from an optical disc recorded at a substantially constant density, the optical disc comprising a recording area comprising circular or spiral tracks provided with a servopattern comprising headers alternating with track portions, the headers being radially aligned and comprising position information, and the track portions comprising an amount of data substantially proportional to the radial position of the track portion concerned, which device comprises a reading head, reading control means and positioning means for positioning the reading head on a track at a position to be read, the positioning means comprising header detecting means for retrieving the position information from the headers.

Such a record carrier and apparatus are known from European Patent Application EP 0 587 019, document D1 in the list of related documents. The document discloses a record carrier in the form of an optical disc having a recording area comprising a pattern of grooves on a substrate, constituting a servopattern of circular or spiral tracks. The recording tracks are subdivided in longitudinal direction into track portions alternating with headers. The headers comprise position information, e.g. an address area comprising pre-recorded address marks. The headers are made during manufacture, e.g. in the form of so-called pre-pits formed by embossing. The address marks represent position information for positioning a recording head on a desired track and are indicative for the address of the recording area following the address area. In a direction transverse to the tracks, i.e. radially, the headers are aligned. The disc comprises one track address and a fixed number of radially aligned servo pits in each turn, constituting a so-called sampled servo pattern. The servo pattern comprising radially aligned elements is called Constant Angular Velocity (CAV) servo pattern, and is to be scanned by a servo system having a phase locked loop (PLL) to generate a servo frequency locked to the rotation frequency of the disc. The address marks are dimensioned to be read clocked by said servo frequency. Further a data phase locked loop is provided for generating a data clock locked to a speed of data read/write operations, which are performed at a substantially constant linear density. Each track portion is arranged for recording an amount of data substantially proportional to the radial position of the track portion concerned. Hence the density is substantially constant across the whole recording area, which corresponds to the well-known constant linear velocity (CLV) system. When jumping to a new radial position, the rotation frequency setting point or the data clock setting point are adjusted to the new position, but the servo phase locked loop remains locked to the CAV servo pattern. Hence the addresses in the headers can always be read at the servo frequency. The recording apparatus comprises an optical system for recording or reading information by generating a spot via a radiation beam on a track of the record carrier. The optical disc is rotated and the spot is positioned in radial direction on the centre of the track by servo means for scanning the track. During scanning the servo phase locked loop is locked to the rotation frequency of the disc for reading the CAV servo pattern. The data phase locked loop is locked to the CLV data speed. The known record carrier and apparatus have the problem, that for reliable operation a first phase locked loop must be locked to the CAV servo pattern, and a second phase locked loop must be locked to the CLV data density.

It is an object of the invention to provide an optical disc, a recording and a reading device arranged for a more reliable data recording and/or retrieval operation while data is recorded at a substantially constant density.

For this purpose an optical disc as described in the opening paragraph is characterized according to the invention in that the position information is provided substantially at said constant density. This has the effect, that the headers are positioned on locations corresponding to a CAV pattern, but have an information content readable by the data clock. There is no need for a second phase locked loop, only one phase locked loop locked to the data frequency is required. Hence, the recording is less complex and more reliable. This is also advantageous in that the space required for the header pattern is reduced when compared to a CLV header pattern, as shown for example in FIG. 2 and described below. Hence the header overhead is reduced, which increases the effective data storage capacity of the disc.

For the purpose mentioned above a recording device as described in the opening paragraph is characterized according to the invention in that the header detecting means are arranged for reading the position information substantially at said constant density. A reading device as described in the opening paragraph is characterized according to the invention in that the header detecting means are arranged for reading the position information substantially at said constant density. This has the effect, that the headers, although positioned corresponding to a CAV servo pattern, can be read by reading means synchronized to the same data clock as used for data recorded in the track portion adjoining the header. This is advantageous in that only one phase locked loop is required to generate the data clock locked to the data speed.

The invention is also based on the following recognition relating to the overhead and reduced data storage capacity incurred by applying headers. Headers in the servo pattern are used to indicate the location of data to be recorded, which data is usually subdivided in logical units called sectors. For example D1 describes a zoned disc having in each zone a fixed number of data sectors fitting in one turn of the track and one header per turn, the first sector starting at said one header. In our invention several headers are required in one turn for fast access to the data after a jump to a new radial position, because otherwise the device would have to wait maximally almost a full rotation of the disc before a header can be read. In known disc formats, such as DVD-RAM and shown in FIG. 2, a number of headers per turn is used in a CLV pattern, i.e. aligned with the sectors and therefore a radially outward increasing number of headers per turn of the track. A relative large header overhead is caused by the CLV header pattern. According to our invention a number of headers in each turn being aligned radially in a CAV servo pattern allow fast recovery of the radial and angular position of the scanning unit. A high average density of data recording is achieved by recording in each track portion an amount of data proportional to the radial position of the track portion concerned causing CLV data density. In particular the inventors have seen, that the disc format can be used for recording data blocks in logical sectors in the following way. The size of the logical sectors is selected independent of the distance between headers and the start of sectors is not necessarily at the headers. Contrary to the CAV system the start of a sector is positioned at an arbitrary location relative to the beginning of the recording area, calculated from the known amounts of data in each preceding track portion. The headers are used only to determine the position of the scanning unit, and the start of a sector is located for example at m channel bits after header n. Hence in the new disc format headers may interrupt a sector at one or more arbitrary locations. However, as the headers are provided at the same density as the data of the sectors, they can be read by the data reading means, recognized as being headers and eliminated from the recovered data. So the number of headers is relatively low and adjusted to the requirements of fast positioning. The low header overhead is advantageous for the total available storage capacity of the disc and therefore for the average density.

An embodiment of the optical disc is characterized in that the recording area is subdivided in a plurality of coaxial annular zones, each track portion within one of the zones for recording a same predetermined amount of data at a track portion density, the average of track portion densities within one zone being substantially equal to said constant density. This has the advantage that the amount of data within each track portion within one of the zones is constant.

A further embodiment of the optical disc is characterized in that the track portions comprise periodic characteristics indicative of the density for the respective track portion. This has the advantage, that a data clock of the required frequency can be generated by a phase locked loop locked to the periodic characteristics. It is to be noted, that the periodic characteristics are available for recorded and unrecorded parts of the recorded area, whereby the headers can be read reliably also in unrecorded areas.

Further advantageous, preferred embodiments of the apparatus and detection unit according to the invention are given in the dependent claims.

Figure 1B:
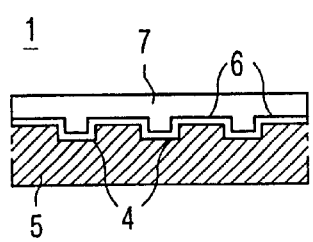
Figure 1C:
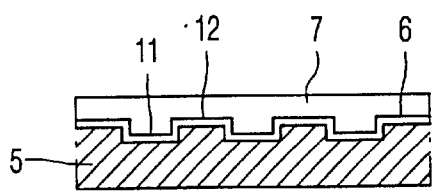
Figure 2:
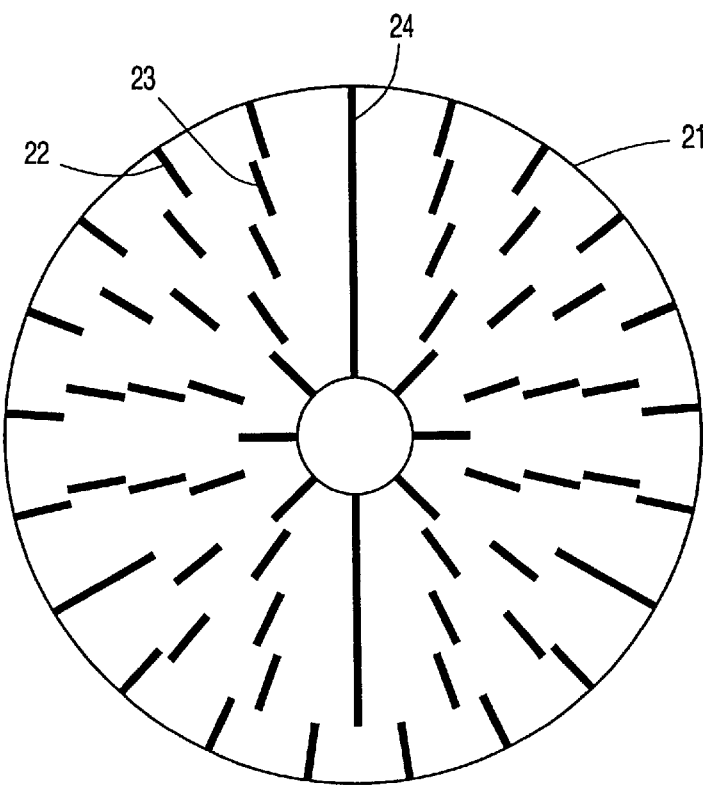
Figure 3:
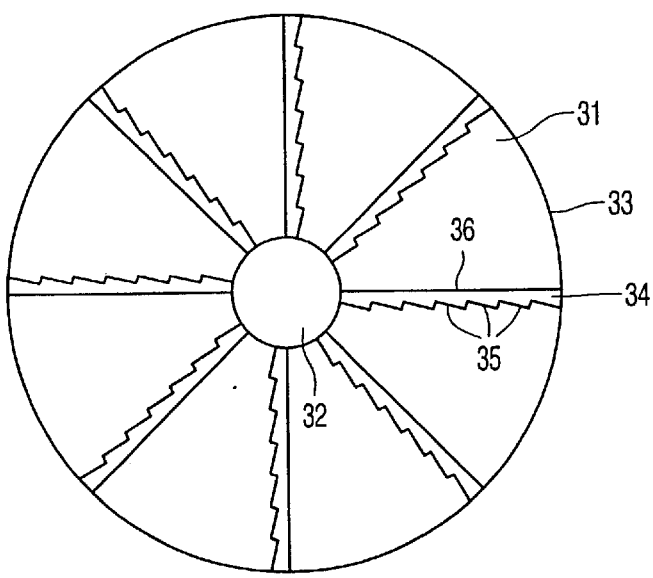
Figure 4A:
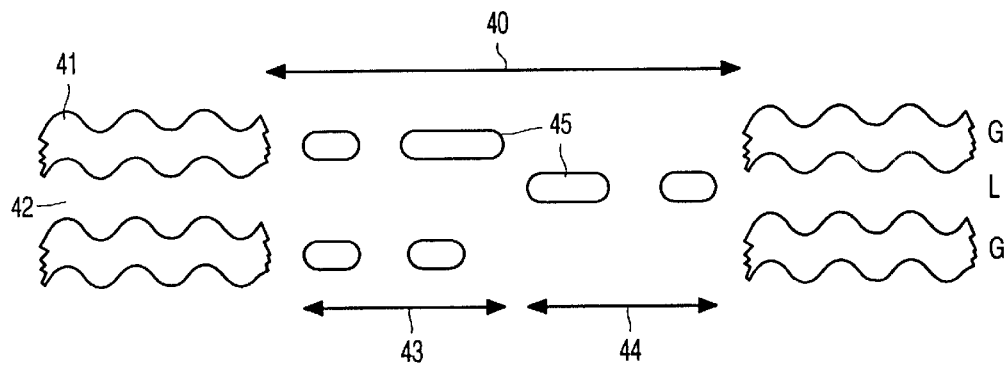
Figure 4B:
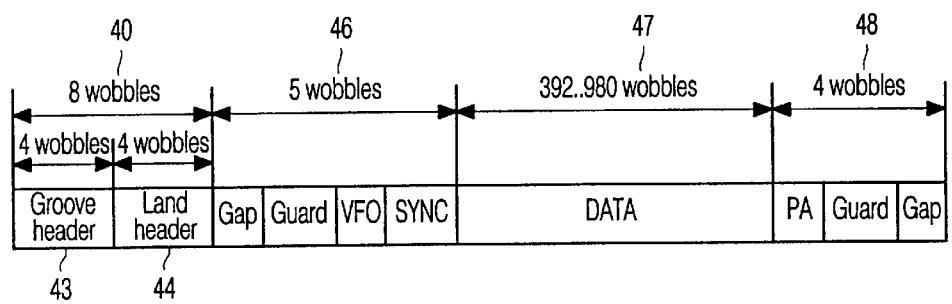
Figure 4C:
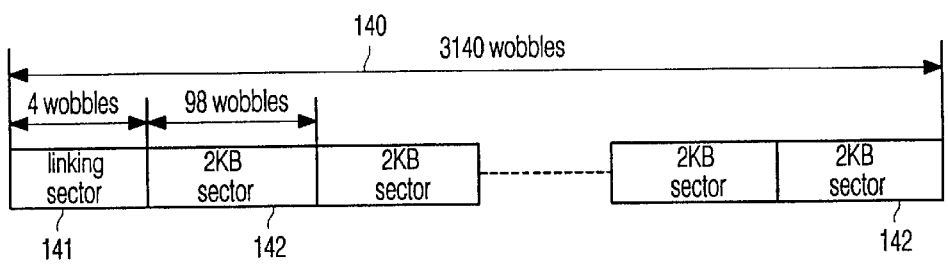
Figure 5:
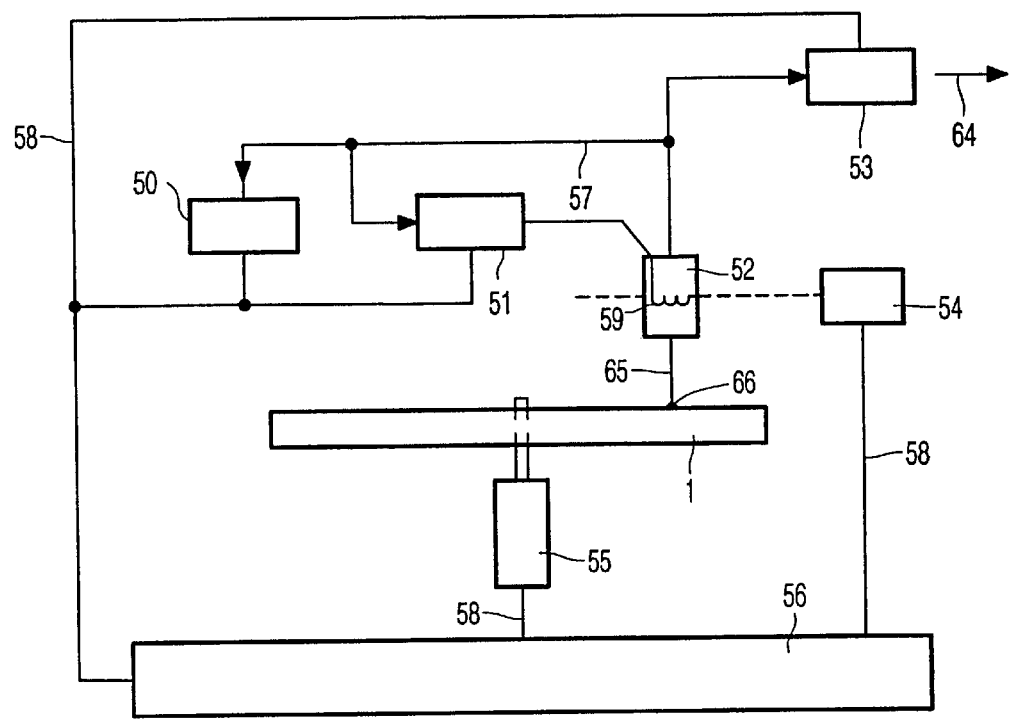
Figure 6:
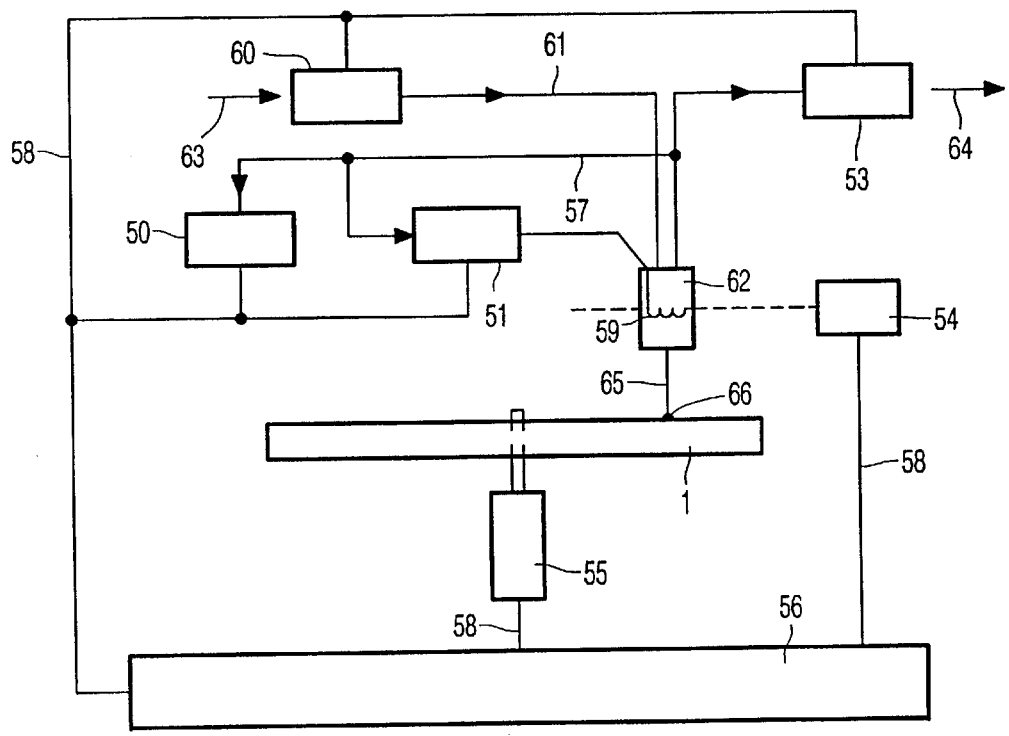
Figure 7:
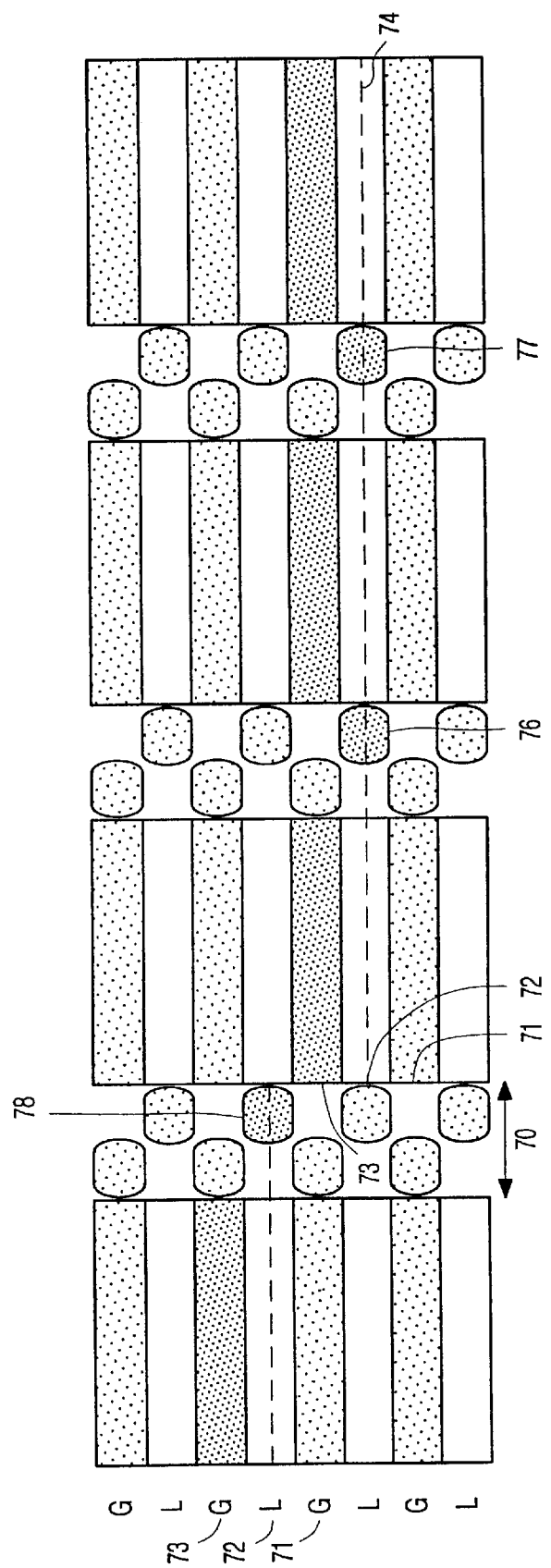

These and other aspects of the invention will be apparent from and elucidated further with reference to the embodiments described by way of example in the following description and with reference to the accompanying drawings, in which FIG. 1 shows a record carrier, FIG. 2 shows a prior art optical disc with a CLV header pattern, FIG. 3 shows a zoned optical disc, FIG. 4 shows a header and sector layout, FIG. 5 shows an apparatus for reading a record carrier, FIG. 6 shows an apparatus for writing and reading a record carrier, and FIG. 7 shows a land/groove servo pattern at a zone boundary.

Corresponding elements in different Figures have identical reference numerals.

FIG. 1a shows a disc-shaped record carrier 1 having a track 9 intended for recording and a central hole 10. The track 9 is arranged in accordance with a pattern of turns constituting substantially parallel spiral tracks. The track 9 on the record carrier is indicated by a pre-embossed track structure provided during manufacture of the blank record carrier. The track structure is constituted, for example, by a pregroove 4 which enables a read/write head to follow the track 9 during scanning. The invention is, applicable in a corresponding manner to other track patterns having substantially parallel tracks, in which the turns are concentric instead of spiral forming circular tracks.

FIG. 1b is a cross-section taken along the line b—b of the record carrier 1, in which a transparent substrate 5 is provided with a recording layer 6 and a protective layer 7. The pregroove 4 may be implemented as an indentation or an elevation, or as a material property deviating from its surroundings. The recording layer 6 may be optically or magneto-optically (MO) writable by means of a device for writing information, for example as in the known CD-Recordable system. During writing, the recording layer is locally heated by a beam of electromagnetic radiation, such as laser light. The recording layer in a re-writable record carrier is constituted, for example, by a phase-change material which acquires an amorphous or crystallized state when it is heated to the correct extent.

FIG. 1c shows an alternative track structure consisting of alternating elevated and deepened tracks, called lands 11 and grooves 12. It is to be noted, that both lands 11 and grooves 12 serve as recording tracks. Each turn has at least one area interrupting the lands and grooves constituting a header area. For a spiral pattern the grooves may be continued as grooves once in each turn after the header area constituting a double spiral by the concatenated lands and the concatenated grooves. Alternatively at least once per turn a transition from land to groove or vice versa is established by switching to the other type after the header area.

According to the invention the tracks are subdivided in recordable track portions 3 by radially aligned headers 2. The track portions 3 are for reading or recording optical marks representing user information, and are preceded by the headers for individually accessing each track portion. The headers comprise position information indicative of the position of the header and the adjoining track portion relative to the beginning of the track or radial and angular parameters, e.g. address marks representing address information. Address marks on a recordable type of record carrier are usually embossed during manufacture to enable positioning of a read/write head anywhere on the still unrecorded record carrier. The headers are located at a few, i.c. four, angular positions in each turn of the track, which corresponds to the header locations used in the Constant Angular Velocity (CAV) system. However the position information in the headers at said CAV locations is written at CLV density, i.e. the marks are encoding the position information at a constant density. This is schematically indicated by the rectangular header areas 2 in FIG. 1a. Due to the CAV location of the headers the track portions have a length proportional to the radial position, i.e. the distance to the middle of the central hole 10. The track portions are recorded at a constant density, and therefore the amount of data in a track portion is proportional to the radial position, called the CLV format. The data within the track portions and the position information in the adjoining header are recorded at the same density and can be read with the same reading means. Data to be recorded is subdivided in sectors of a fixed length, which are recorded from a first arbitrary angular and radial position to a second arbitrary position, said positions being in between headers. In the disc format according to the invention there is no requirement to have a number of sectors fitting exactly in a turn, which gives additional advantages in average data density, because no zoning or small zones can be used. Said arbitrary positions can be calculated according to a few formula's knowing the amounts of data recordable in each track portion. Hence a reduced header overhead is achieved using a few CAV aligned headers per turn and writing sectors at CLV data density, which sectors are not aligned to the headers.

FIG. 2 shows a prior art optical disc 21, such as DVD-RAM, using a zoned CLV format (CLV=Constant Linear Velocity, i.e. constant recording density independent of the radial position). Headers 22,23,24 are provided for each sector, and the recording area of the disc is subdivided in coaxial annular zones. Each track portion within one of the zones accommodates one sector, and the associated header comprises a physical address for that sector. Each zone has a fixed number of sectors in a turn, and the number of zones increases by one for each radially outward next zone. The headers 24 of the first sector in each turn are aligned radially. The further headers 22,23 are aligned within the zone, and within said zone the amount of data recorded in a turn remains constant according to the CAV system (Constant Angular Velocity). The format of this disc is called ZCLV (Zoned CLV). However the prior art ZCLV disc has a significant loss of data storage capacity due to the large amount of headers. This loss is referred to as overhead, which overhead is reduced by the invention.

FIG. 3 shows a zoned optical disc according to the invention. The disc has a recording area 31 from an inner diameter 32 to an outer diameter 33. The recording are comprises circular or spiral tracks (as shown in FIG. 1) and the tracks are interrupted by headers 34 forming track portions. The headers are radially aligned, in particular the beginning of the headers is aligned along straight radial lines 36. The recording area 31 of the disc is subdivided in coaxial annular zones, and within each zone the track portions are arranged for recording a same amount of data. Within a zone the density starts at a nominal level, say the CLV density, and decreases proportional to the radial position of the track portion concerned, and at the beginning of a next zone the density is set to the nominal level. Hence the density within each zone is according to the CAV system. The average density of the total recording area is a little below the nominal CLV level, such a zoning loss being dependent on the number of zones, e.g. larger with only a few large zones. Hence each track portion within one of the zones is arranged for recording a same predetermined amount of data at a track portion density, and the average of track portion densities within one zone is substantially equal to said CLV density. The headers are written at the data density, which decreases outwardly within a zone according to the CAV system, the ending portions 35 of the headers are aligned at radial line-pieces 35 at a different angle constituting a sawtooth like structure on each spoke. In an embodiment of the disc the track portions are provided with periodic characteristics indicative of the density for the respective track portion. During scanning in a reading device the periodic characteristics generate a periodic signal in a scanning unit, e.g. in the servo signals or the data reading signal. The periodic signals can be used to synchronize the data recording or reading, e.g. by a phase locked loop circuit locked to the periodic signal. The periodic characteristics may be a variation of the track position in a direction transverse to the track called a wobble, or other variations of width or depth of the track. A track wobble for a CLV disc without headers, e.g. a CD-R, is described in U.S. Pat. No. 4,901,300 (D2). In an embodiment of the zoned disc according to the invention the track wobbles within a zone are radially aligned. The number of wobbles within a track portion is constant, and a fixed amount of data corresponds to one wobble, e.g. one wobble is 324 channel bits, and a frame is 6 wobbles or 1944 channel bits or 155 data bytes for a given channel code.

FIG. 4 shows a header and sector layout. FIG. 4a shows a land/groove pattern interrupted by headers in an enlarged and schematic way. A first groove 41 is interrupted by a header area 40. A first land 42 radially adjoins the first groove 41, and further grooves and lands follow. The grooves are provided with a transversal variation of the location, the so-called wobble, which is aligned between grooves. The header area is subdivided in a first portion 43 used for groove headers and a second portion 44 for land headers. Hence the reading of address marks 45 representing the position information is not disturbed by interference from address marks in a radially neighbouring area.

FIG. 4b shows a header and track portion layout indicating the logical assignment of information stored. The unit of length is the wobble period, which corresponds to a fixed amount of channel bits as explained above. First a header are 40 is given, subdivided in a groove header portion 43 and a land header portion 44. Thereafter a 5 wobble control portion 46 follows for controlling the reading of stored data. The control portion 46 is subdivided in a Gap (non written area directly adjoining the header area), a Guard area for starting the writing operation (some variation in the starting point allowed to prevent wear), a VFO area for locking a Variable Frequency Oscillator, and a SYNC pattern for logically synchronising the channel code. After the control portion 46 a DATA area 47 follows for storing the user data, which DATA area has a length in dependence on the radial position of the track portion. The last part 48 of the track portion before the next header area is subdivided in a PA, a Post Amble for closing the channel code encoding, a second Guard and Gap with similar function as Gap and Guard in the control portion 46.

FIG. 4c shows the logical data format. User data is subdivided in sectors 142 of a fixed length of 2 kByte, which each for example require 98 wobbles when recorded. A number of sectors, e.g. 32, are joined together forming an ECC block, in which Error Correcting Codes are included for correcting errors anywhere in the ECC block. Such a long ECC block provides better protection against burst errors, and constitutes the minimum amount of data to be written. Also if only one sector must be changed, the full ECC block is to be rewritten including newly calculated error codes. A linking sector 141, which is only a few wobbles, is reserve as buffer in between ECC blocks to allow independent writing of such blocks. Usually the linking sector is written with dummy data to make sure that no intermediate blank areas remain. Obviously the ECC block does not fit in a track portion, the block may be larger or smaller then the DATA area 47 within a track portion. The actual start of an ECC block can be easily calculated from the length of the block, the block address and the size of the track portions, which varies in a predetermined way in dependence on the radial position. Said calculation gives a track number, a header number within the track and a distance from that header, e.g. expressed as a number of wobbles. In an embodiment of the optical disc the position information in the header comprises a track number indicative of the radial position of the track and header number indicative for the angular position of the header. It is to be noted that a specific header will always be within a block with a specific address and there will always be located a next block at a known distance from that header. In an embodiment of the optical disc the position information in a header comprises a block address indicative of the block locatable at the header and a next block indicator indicative of the distance from the header to the start of the next block. The block address may be the block starting before and including said header, or it may be the address of the next starting block.

FIGS. 5 and 6 show apparatuses according to the invention for scanning a record carrier 1. The apparatus of FIG. 5 is arranged for reading the record carrier 1, which record carrier is identical to the record carriers shown in FIG. 1 or FIG. 3. The device is provided with drive means 55 for rotating the record carrier 1, and a read head 52 for scanning the track on the record carrier. The read head comprises an optical system of a known type for generating a radiation spot 66 focused on a track of the recording layer of the record carrier via a radiation beam 65 guided through optical elements. The radiation beam 65 is generated by a radiation source, e.g. a laser diode. The read head further comprises a focusing actuator for focusing the radiation beam 65 on the recording layer and a tracking actuator 59 for fine positioning of the spot 66 in radial direction on the centre of the track. The tracking actuator 59 may comprise coils for radially moving an optical element or may be arranged for changing the angle of a reflecting element on a movable part of the read head or on a part on a fixed position in the case part of the optical system is mounted on a fixed position. The radiation reflected by the recording layer is detected by a detector of a usual type, e.g. a four-quadrant diode, for generating a detector signals 57 including a read signal, a tracking error and a focusing error signal. The apparatus is provided with tracking means 51 coupled to the read head for receiving the tracking error signal from the read head and controlling the tracking actuator 59. During reading, the read signal is converted into output information, indicated by arrow 64, in the reading means 53, for example comprising a channel decoder and an error corrector. The apparatus is provided with an header detector 50 for detecting the header areas and retrieving address information from the detector signals 57 when scanning the header areas of the tracks of the record carrier. The header detecting means are arranged for reading the position information from the headers substantially at the data density, which substantially corresponds to the constant density used in CLV. The apparatus has positioning means 54 for coarsely positioning the read head 52 in the radial direction on the track, the fine positioning being performed by the tracking means 59. The device is further provided with a system control unit 56 for receiving commands from a controlling computer system or from a user and for controlling the apparatus via control lines 58, e.g. a system bus connected to the drive means 55, the positioning means 54, the header detector 50, the tracking means 51 and the reading means 53. To this end, the system control unit comprises control circuitry, for example a microprocessor, a program memory and control gates, for performing the procedures described below. The system control unit 56 may also be implemented as a state machine in logic circuits. It is to be noted, that the headers are located at CAV positions, and therefore the amount of data in the track portions is dependent on the radial position. The reading means 53 are arranged for eliminating the headers from the data read, which eliminating may be controlled via the control lines 58 by the header detector 50. Alternatively the reading means are provided with deformatting means, which-recognize and remove the headers and further control information from the data stream.

The system control unit 56 is arranged to perform the position information recovery and positioning procedure as follows. A desired block address is derived from a command received from the user or from a controlling computer. The position of the block expressed in a track number and header number and distance from said header is calculated based on the known amounts of data stored in each track portion. A table may be used for a zoned format, giving for each zone the first block address and the length of the track portions, which is fixed during a zone. The radial distance from the current position to the desired track number is determined and a control signal is generated for positioning means 54 to radially move the read head 52 to the desired track. When the radial movement is completed a header is read by the header detector 50. The read signal of the header is processed to detect if the desired track is being read. If so, the system control unit waits until the arrival of the desired header. After this header any data before the calculated distance from the header is discarded, and data from the desired block is read from a linking position within the linking sector described with reference to FIG. 4c. In practice all data starting at the header will be read, and any data before the start of the requested block will be discarded, and for reading the linking position is effectively equal to the start of the block.

Preferably the system control unit 56 is arranged for combining the first amount of data from a first track portion with at least one further amount of data read from a consecutive track portion, the at least one further amount of data comprising a final amount of data retrieved from a track portion up to a next linking position. Hence the total ECC block comprises a first amount from part of the first track portion read, a final amount from part of the last track portion read and as much intermediate amounts from track portions between the first and last track portion.

FIG. 6 shows a device for writing information on a record carrier according to the invention of a type which is (re)writable in, for example a magneto-optical or optical manner (via phase change or dye) by means of a beam 65 of electromagnetic radiation. The device is also equipped for reading and comprises the same elements as the apparatus for reading described above with FIG. 5, except that it has a write/read head 62. The write/read head 62 has the same function as the read head 52 together with a write function and is coupled to writing means 60, which comprise for example a formatter, an error coder and a channel coder. The information presented to the input of the writing means 60 (indicated by the arrow 63) is distributed over logical and physical sectors according to formatting and encoding rules and converted into a write signal 61 for the write/read head 62. The system control unit 56 is arranged for controlling the writing means 60 and for performing the position information recovery and positioning procedure as described above for the reading apparatus. During the writing operation, marks representing the information are formed on the record carrier. Writing and reading of information for recording on optical discs and usable formatting, error correcting and channel coding rules, are well-known in the art, e.g. from the CD system. In particular the header detecting means 50 are arranged for reading the position information from the headers substantially at the data density, which substantially corresponds to the constant density used in CLV. In the recording device or the reading device the header detecting means are synchronized to a data clock, which clock is generated by clock generation means. The data clock is also used to control the writing means 60 and/or the reading means 53. The clock generation means can be controlled by the system control unit 56 based on the radial position, the zone and the rotation rate of the disc. In an embodiment of the device the clock generation means comprise a phase locked loop, for example accommodated in the header detection means, which phase locked loop is locked to the periodic characteristics of the track, such as the wobble, during scanning. After a jump of the head 52,62 to a new scanning location the clock generation means may be preset to the data clock value at the new location, or the bandwidth of said phase locked loop may be increased to lock quickly to the new wobble frequency.

FIG. 7 shows a land/groove servo pattern at a zone boundary. The tracks marked L (land) and G (groove) are to be scanned from left to right and are connected via a spiral (not shown) to the left side of the Figure. The tracks are provided with wobbles or other preformed variations indicative of the track portion data storage density. A first groove track 71 is the last track of a first zone and has a wobble corresponding to the data density in that zone, the last part of said first groove track being shown on said left side of the Figure. After the interruption by header area 70 the first groove track 71 continues as second groove track 73 belonging to the next zone, which is provided with the wobble according to that next zone, and hence the intermediate land track 72 forms the zone boundary 74. From zone to zone the number of wobbles in a track portion may be increased, e.g. by 1 wobble or by a frame of 6 wobbles. In the land/groove format the wobble is implemented in the groove, and on the land the wobbles of both neighbouring grooves are added in the servo signal. On the land 72 between two zones there is in interference between the two wobbles of slightly different period, e.g. when the number of wobbles in a track portion is increased by one frame (6 wobbles) at a zone boundary, the servo signal will be extinct to zero six times. The advantage of having only one wobble increase per track portion at a zone boundary is, that only one extinction of the servo signal occurs. Having one or only a few extinctions in a boundary track portion gives a sufficiently long area before a header where the servo signal is present at a sufficient amplitude to keep said phase locked loop in lock. Hence reading of the header is possible also at the boundary track portions and even recording data in such track portions is possible. Alternatively said boundary track portions may be skipped, and even at least one header directly following a boundary turn. The servo signal of land track 72 has an interference of the two different wobbles and is not easily usable for data storage. Additional measures may be taken in the recording and reading device to counter the effects of the interference, but in a practical embodiment the land track 72 is not used for data storage for a full turn, the unused turn forming the zone boundary 74. It is to be noted, that on the boundary 74 the first land header 76, the second land header 77, etc. up to the last land header 78 cannot be reliably read because of said interference. In an embodiment of the disc (for reliable operation) two additional headers are not used, resulting in 1.25 unused land track at eight headers in a turn. In an embodiment of the disc (for symmetry reasons, i.e. the same total storage capacity for land and groove) the capacity of the groove tracks is limited also by skipping the same amount of groove tracks at each zone boundary, shown in FIG. 7 as the groove track 73.

Although the invention has been explained by embodiments using four or eight headers in each turn, it will be clear that other numbers or a combination of numbers can be employed in the invention. For instance, a disc of a recordable type has been described, but the invention can be applied also to discs comprising recorded data, or discs of a read-only type. Further, the invention lies in each and every novel feature or combination of features.

List of Related Documents (D1) EP-A 587 019 Optical disc system and information processing system (D2) U.S. Pat. No. 4,901,300 Wobbled CLV optical disc (PHN 12.398)

What is claimed is:

1. An optical disc comprising:
  a recording area for recording data at a substantially constant density;
  circular or spiral tracks in the recording area;
  headers alternating with track portions in the tracks, the headers being radially aligned and containing position information, the track portions being arranged for storing an amount of data substantially proportional to the radial position of the track portion concerned, and the position information is provided substantially at the constant density.

2. The optical disc of claim 1, wherein:
  the recording area is subdivided in a plurality of coaxial annular zones,
  each track portion within one of the zones for recording a same predetermined amount of data at a track portion density, and
  the average of track portion densities within one zone being substantially equal to the constant density.

3. The optical disc of claim 2, wherein the position information is provided at the track portion density.

4. The optical disc of claim 2, wherein a turn of the track contains several headers, which headers within multiple zones are radially aligned with corresponding headers in the radially outward adjoining zone.

5. The optical disc of claim 4, wherein the turn contains eight headers.

6. The optical disc of claim 1, wherein the track portions have periodic characteristics indicative of the density for the respective track portion.

7. The optical disc of claim 6, wherein the periodic characteristics include a radial track wobble.

8. The optical disc of claim 6, wherein the periodic characteristics are radially aligned within each one of the zones.

9. The optical disc of claim 1, wherein:
  the data is subdivided in addressable blocks of a predetermined size, which size differs from the amount of data recordable in a track portion; and
  the position information includes: a block address indicative of the block locatable at the header; and a next block indicator indicative of the distance from the header to the start of the next block.

10. The optical disc of claim 1, wherein the position information includes a track number indicative of the radial position of the track and header number indicative for the angular position of the header.

11. The optical disc of claim 1, wherein the recording area includes recorded data.

12. The optical disc of claim 11, wherein the optical disc is of a read-only type.

13. The optical disc of claim 1 wherein the headers are all radially aligned at least within a range of sequential turns of the tracks, in which range the amount of data that turns of the tracks are adapted to store varies substantially with the radial position of the turns within the range.

14. A recording device for recording data at a substantially constant density on an optical disc with a recording area with circular or spiral tracks including headers alternating with track portions, the headers being radially aligned and containing position information, and the track portions being arranged for recording an amount of data substantially proportional to the radial position of the track portion concerned, which device comprises:

a recording head, recording control means for controlling the recording of data on the optical disc, and positioning means for positioning the recording head on a track at a position to be recorded, the positioning means including header detecting means for retrieving the position information from the headers, the header detecting means reading the position information substantially at the constant density.

15. The recording device of claim 14, wherein the recording area on the optical disc is subdivided in a plurality of coaxial annular zones, and the recording control means are arranged for recording in one of the track portions within one of the zones a same predetermined amount of data at a track portion density, the average of track portion densities within one zone being substantially equal to the constant density.

16. The recording device of claim 14, wherein:

the track portions have periodic characteristics indicative of the density for the respective track portion, and the recording control means are arranged for controlling the speed of recording in dependence on the periodic characteristics.

17. The recording device of claim 14, wherein the recording control means are arranged for recording the data subdivided in addressable blocks of a predetermined size, which size differs from the amount of data recordable in a track portion, and for starting the recording of one of the blocks at a linking position at a distance from the preceding header in dependence on the position information.

18. A reading device for reading data from an optical disc recorded at a substantially constant density, the optical disc having a recording area with circular or spiral tracks with a servopattern including headers alternating with track portions, the headers being radially aligned and containing position information, and the track portions containing an amount of data substantially proportional to the radial position of the track portion concerned, which device comprises:

a reading head, reading control means for controlling the reading of data from the optical disc, and positioning means for positioning the reading head on a track at a position to be read, the positioning means including header detecting means for retrieving the position information from the headers, the header detecting means are arranged for reading the position information substantially at the constant density.

19. The reading device of claim 18, wherein the reading control means are arranged for retrieving the data in addressable blocks of a predetermined size, which size differs from the amount of data readable from a track portion, the retrieving of one of the blocks including retrieving a first amount of data starting at a linking position at a distance from the header preceding the track portion concerned, which track portion includes a further amount of data belonging to a preceding block between the header and the linking position.

20. The reading device of claim 19, wherein the retrieving includes combining the first amount of data with at least one further amount of data read from a consecutive track portion, the at least one further amount of data including a final amount of data retrieved from a track portion up to a next linking position.

21. A recording device comprising:

a recording head for recording data on circular or spiral tracks of an optical disc;

means to control the recording of the data in track portions alternating with headers containing position information, the track portions being adapted for storing data at a constant density so that an amount of data recordable in a track portion varies substantially in proportion to the radial position of the track portion; and positioning means for positioning the recording head on a track at a position to be recorded depending on the varying amount of data that can be stored in the track portions, the positioning means including header detecting means for retrieving position information from a header depending on the alignment of the headers, the header detecting means reading the position information substantially at the constant density.

22. A reading device comprising:

a read head for reading data from circular or spiral tracks of an optical disc;

means to control the reading of the data from track portions alternating with headers containing position information, the track portions containing data at a constant density so that an amount of data contained in a track portion varies substantially in proportion to the radial position of the track portion; and positioning means for positioning the reading head on a track at a position to be read depending on the varying amount of data contained in the track portions, the positioning means including header detecting means for retrieving position information from a header depending on the alignment of the headers, the header detecting means reading the position information substantially at the constant density.

23. An optical disc comprising:

a substrate;

sequential turns of a spiral track or circular tracks on the substrate;

headers alternating with track portions, the headers containing position information, the track portions being adapted for containing predefined amounts of information, the headers of sequential tracks being aligned, and wherein sequential turns containing substantially different amounts of information have the same number of aligned headers.

24. A recorder adapted to record information on the optical disc of claim 23.

25. A reader adapted to read information from the optical disc of claim 23.

26. An optical disc comprising:

a substrate;

sequential turns of a spiral track or circular tracks on the substrate;

headers alternating with track portions, the headers containing position information, the track portions being divided into sectors adapted for containing the same predefined amount of information, the headers of sequential turns being radially aligned and at least some sectors of the sequential turns being out of radial alignment.

27. A recorder adapted to record information on the optical disc of claim 26.

28. A reader adapted to read information from the optical disc of claim 26.

29. An optical disc comprising:

a substrate;

sequential turns of a spiral track or circular tracks on the substrate;

headers alternating with track portions in the turns, the headers containing position information, the track portions being divided into multiple sectors adapted for containing the same predefined amount of information, some of the sectors being interrupted by headers so that portions of these sectors extend on both sides of the headers.

30. A recorder adapted to record information on the optical disc of claim 29.

31. A reader adapted to read information from the optical disc of claim 29.

32. An optical disc comprising:

a substrate;

sequential turns of a spiral track or circular tracks on the substrate;

headers alternating with track portions in the turns, the headers containing position information, the track portions being divided into multiple sectors adapted for containing the same predefined amount of information, a plurality of sequential turns each containing non-integral numbers of sectors.

33. A recorder adapted to record information on the optical disc of claim 32.

34. A reader adapted to read information from the optical disc of claim 32.

35. The optical disc of claim 1, wherein:

the recording area is subdivided in a plurality of coaxial annular zones, each track portion within one of the zones for recording a same predetermined amount of data at a track portion density, and the average of track portion densities within one zone being substantially equal to the constant density;

the position information is provided at the track portion density;

a turn of the track contains several headers, which headers within multiple zones are radially aligned with corresponding headers in the radially outward adjoining zone;

the turn contains eight headers;

the track portions have periodic characteristics indicative of the density for the respective track portion;

the periodic characteristics include a radial track wobble;

the periodic characteristics are radially aligned within each one of the zones;

the data is subdivided in addressable blocks of a predetermined size, which size differs from the amount of data recordable in a track portion;

the position information includes: a block address indicative of the block locatable at the header; and a next block indicator indicative of the distance from the header to the start of the next block;

the position information includes a track number indicative of the radial position of the track and header number indicative for the angular position of the header;

the recording area includes recorded data; and the optical disc is of a read-only type.

\* \* \* \* \*